March 21, 1939.  G. S. PIROUMOFF ET AL  2,151,229
SECTIONALIZED VEHICLE BODY
Filed April 14, 1938   3 Sheets-Sheet 1
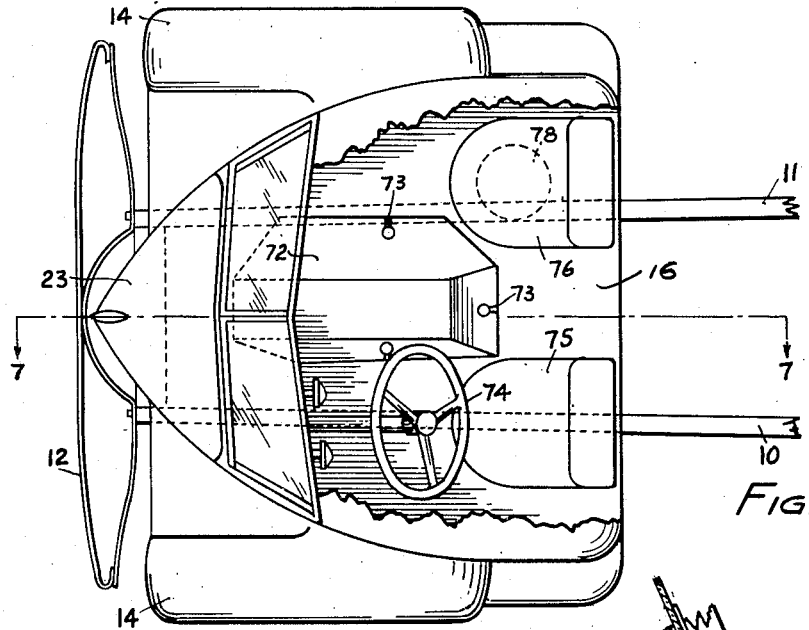
FIG. 3.
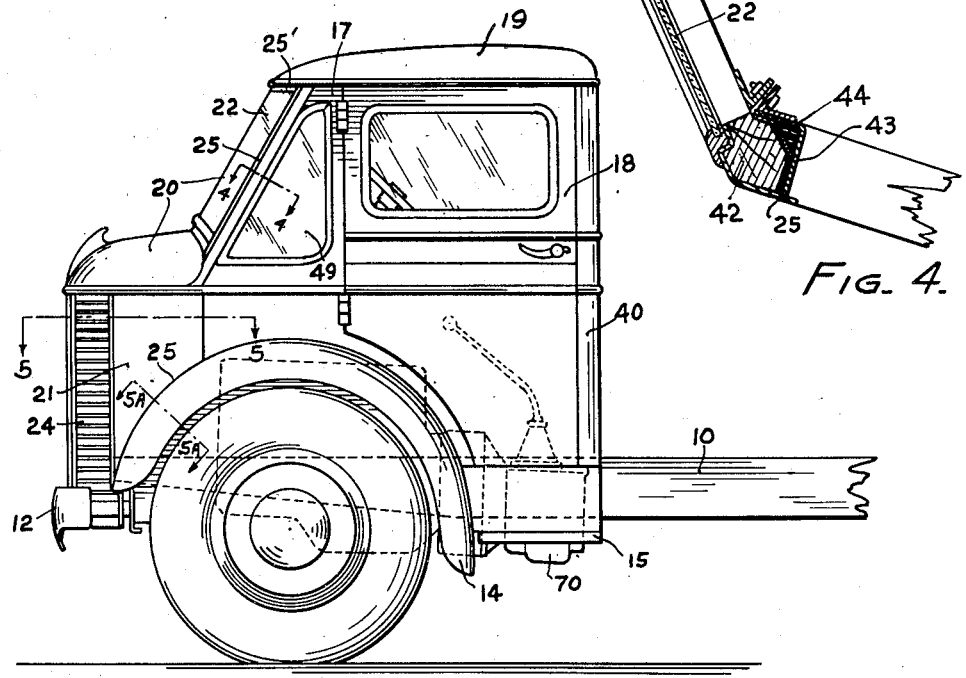
FIG. 4.
FIG. 1.
INVENTORS
George S. Piroumoff
Lester L. Cross
BY
Louis Illmer, ATTORNEY.

March 21, 1939.                G. S. PIROUMOFF ET AL                2,151,229
                              SECTIONALIZED VEHICLE BODY
                      Filed April 14, 1938        3 Sheets-Sheet 2
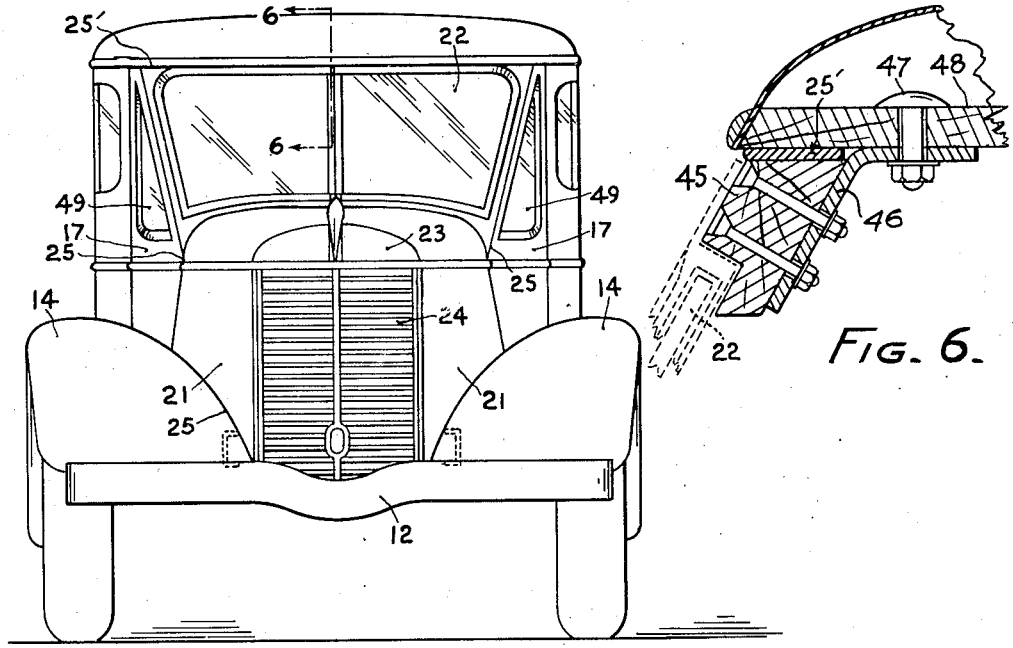
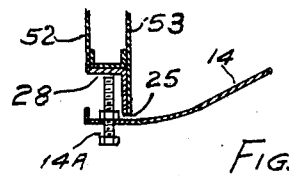
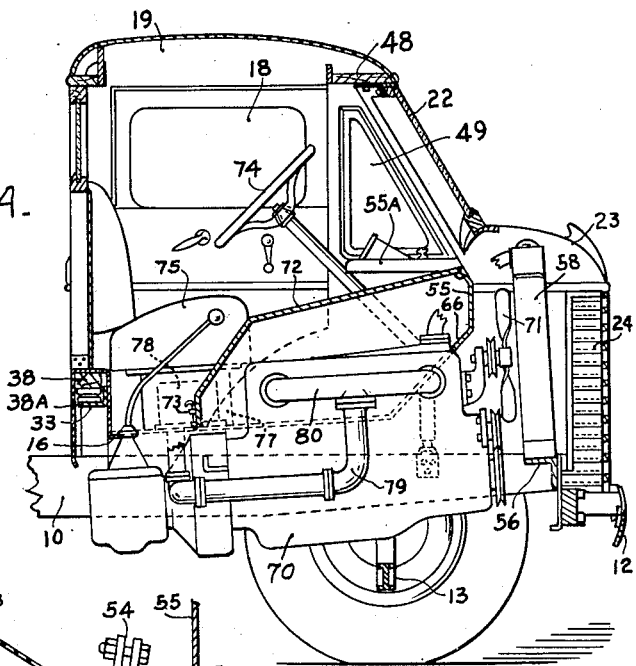
INVENTORS
George S. Piroumoff,
Lester L. Cross,
Louis Illmer ATTORNEY.

March 21, 1939. G. S. PIROUMOFF ET AL 2,151,229
SECTIONALIZED VEHICLE BODY
Filed April 14, 1938 3 Sheets-Sheet 3
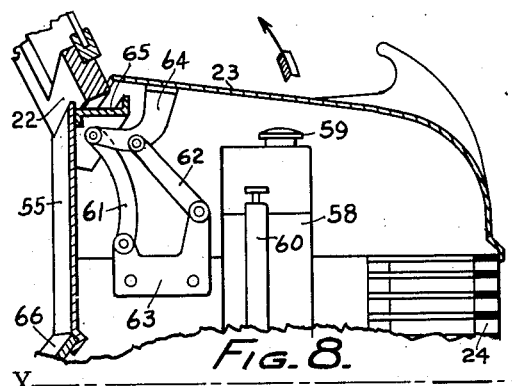
Fig. 8.
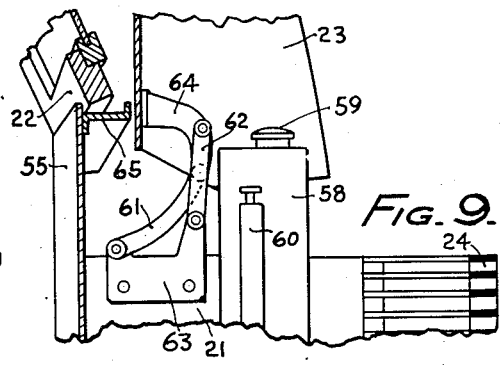
Fig. 9.
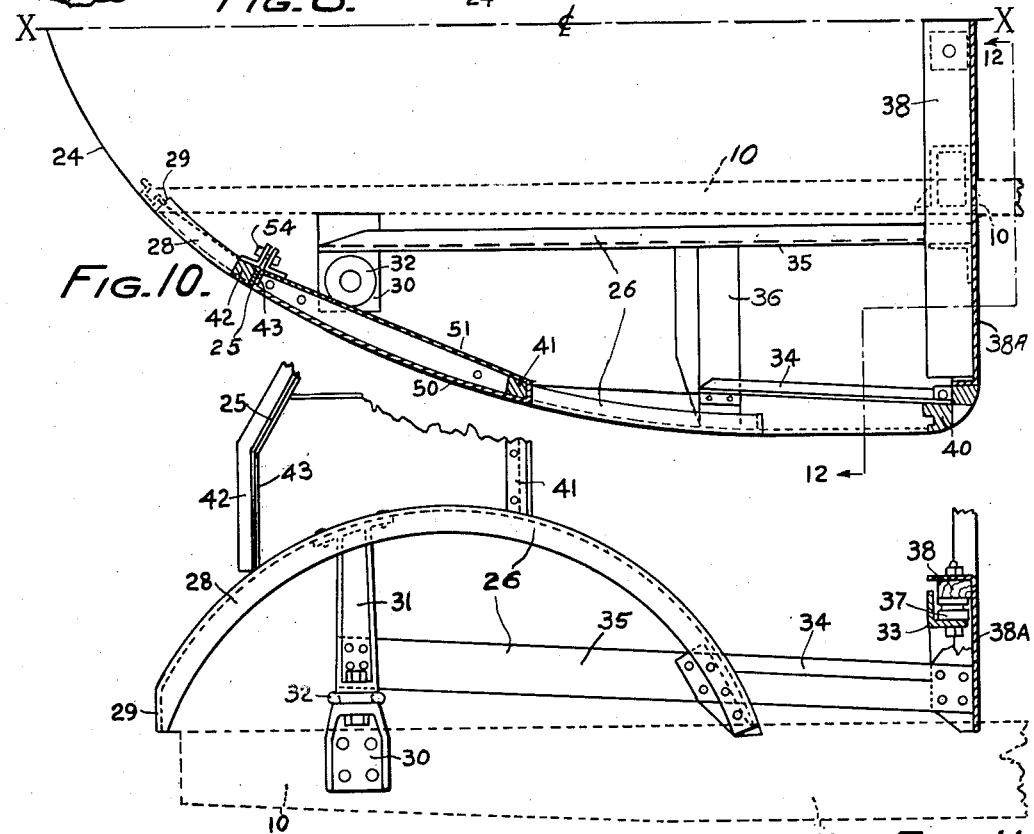
Fig. 10.
Fig. 11.
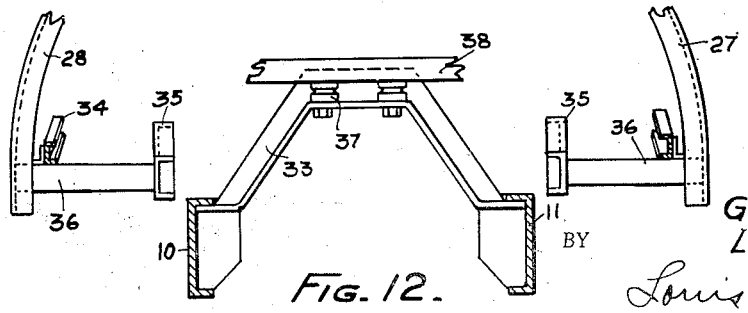
Fig. 12.
INVENTORS
George S. Piroumoff.
Lester L. Cross.
BY
Louis Illmer ATTORNEY.

Patented Mar. 21, 1939

2,151,229

UNITED STATES PATENT OFFICE 2,151,229

SECTIONALIZED VEHICLE BODY

George S. Piroumoff, New York, and Lester L. Cross, Cortland, N. Y., assignors to Brockway Motor Company, Inc., Cortland, N. Y., a corporation of New York Application April 14, 1938, Serial No. 202,024

14 Claims. (Cl. 180—54)

The present invention relates to motorized vehicle construction and more particularly embodies an improved truck, bus, van or other body compartment of the so-called cab-over-engine type in which the motive power is compactly mounted forwardly of the driver's seat whereby the maximum available pay load space may be obtained without unduly raising the seat level or disfiguring the trim appearance of the cab exterior.

Because of the resulting close engine confinement, convenient access thereto for minor adjustments or major repairs is likely to become seriously obstructed. It is the intent of the instant innovations to facilitate the making of such adjustments and repairs by the use of a bodily removable frontal cab section.

Such stream-lined closure walls of nose shaped profile may be designed to include the windshield, a tiltable radiator hood together with forwardly projecting side wall portions or skirt panels and this demountable unit is adapted to separate along mated part lines that may respectively extend from the cab deck downwardly around the wheel fender in zig-zag or the like offset formation. The engine assembly bridges the chassis beams in a substantially centered relation over the front wheel drop axle. Said engine cooperates with a transversely disposed and forwardly erected radiator core which is screened by a separable grille that spans the front end of the spaced chassis beams and lies a comparatively short distance ahead of the windshield. Our exposed radiator hood is horizontally mounted between the windshield and said grille and when lifted, affords access to the filler cap, oil sump gauge and certain other motive parts. A removable cover is disposed interiorly of the cab confines to gain access to the rear working parts of the engine and to prevent fumes from entering the driver's compartment.

Our truck body may be independently fabricated as a standardized cab unit and a rearward load carrying unit, in which event our improved frontal section is confined to the cab unit whereby the rear loading space may be interchangeably made up as a van, express, stake or any other kind of commercial body.

The primary object of this invention is to provide for an attractive cab assembly of the indicated character that shall afford the optimum of loading space for a given wheel base and which cab can readily be fabricated on a low cost productive basis when arranged to facilitate engine attendance and the making of repairs thereto in the contemplated manner.

Embodied herein are also other novel structural features designed to carry out the end in view. Reference is had to the accompanying three sheets of drawings that illustrate a preferred exemplification, and in which drawings:

Fig. 1 is an elevational side view of a cab equipped with our improvements.

Figs. 2 and 3 respectively show a front and a top view thereof, the latter having the deck partially cut away to reveal the cab interior.

Figs. 4 and 5 respectively represent cross-sectional details taken along lines 4—4 and 5—5 of Fig. 1.

Figs. 5A and 6 respectively depict structural details taken along line 5A—5A of Fig. 1 and line 6—6 of Fig. 2.

Fig. 7 shows a vertical cross-sectional view of an assembled cab taken centrally therethrough along line 7—7 of Fig. 3.

Figs. 8 and 9 fragmentally illustrate in enlarged scale, our linked radiator hood in alternative positions.

Figs. 10 and 11 respectively detail a half plan view and a full elevational side view of a certain subframe utilized in our cab structure.

Fig. 12 is a schematic elevational rear view of the completed Fig. 10 as taken along the broken line 12—12 of the latter.

Referring more specifically to these disclosures, our conventional chassis comprises a pair of longitudinal frame beams 10 and 11. The forward ends thereof are bridged by a front bumper 12 and the drop axle 13 provided with tired front wheels. A semi-circular fender guard 14 is disposed concentrically about each such wheel to clear the same and may respectively be extended rearward to constitute a cab running board 15 that is elevated one step above the road bed.

As shown, the cab body comprises a floor board 16 lying one step above the running board. This floor is collectively enclosed within fixed complementary side walls such as 17 including a door 18 therethrough, a transverse tail wall, a cab deck 19 that spans said side walls, and a unitary stream-lined or stepped frontal wall, designated in its entirety as 20 in Fig. 1. Said independently demountable frontal wall constitutes the essence of the present invention. As such, it preferably comprises a pair of arcuate skirt panels 21 that respectively extend forwardly in abutting alignment with a contiguous side wall 17, a framed windshield casing 22, and a nose shaped radiator hood 23 of which its tip is adapted to swing upwardly away from the radiator and rearward toward the windshield. The forward vertical edges of said skirts 21 are bridged by an upstanding grillework 24 arranged to feed cooling air through the spaced slats thereof. Said frontal wall 20 may be made bodily removable along mated zigzag part lines or faces identified as 25, of which the lower forward portion preferably conforms with the curvature pattern of the fender as schematically indicated in Fig. 1, although such offset parting face may also be otherwise disposed.

In building up our cab, we preferably start with the assembly of an understructure or skeletonized subframe 26 of the kind detailed in Figs. 10 to 12 which is symmetrically arranged with respect to the chassis center-line X—X. Such heavily reenforced framework is intended to uphold a substantial portion of the cab superstructure, and as such may comprise a pair of reversely warped angle irons or the like metallic right hand and left hand wheel housing rails 27 and 28. The elevational side view thereof as seen in Fig. 11, embracingly conforms to the circular perimeter given to the fender guard 14 or its inwardly extending apron. In their top view, the respective rails may be bent by means of suitable forming dies into reversed arcuate contour so that the forward rail portions converge toward a rounded nose shape to terminate in squared end faces such as 29 adapted to have the grillework 24 liftably interposed therebetween in the Fig. 5 manner.

The so-called apron portion of each fender guard may be extended inwardly into adjacency with a contiguous curved rail. Each forward rail portion may be spacedly mounted beneath the curved lower skirt edge as in Fig. 5A. A series of adjustable stay bolts such as 14A may be radially arranged to prevent direct rubbing contact of the adjacent fender 14 along its parting face 25. Each rearward rail portion may be mounted in a similarly spaced relationship with respect to its side wall 17 or if preferred, the rear rail portion may as an alternative be fixedly attached to make an interlocked joint with a side wall, except that when affixed thus, a damaged fender cannot readily be replaced. Such bodily demountable fender guard may be independently sustained on a contiguous chassis beam.

The forwardly projecting rail ends of our subframe may during fabrication, be provisionally interconnected by a removable tie piece (not shown). Furthermore, it is not essential that each rail be made up in a single piece; in certain instances, said forwardly projecting rail ends may be dispensed with as superfluous. The medial region of each such continuous rail may be separately propped by duplex or sectionalized stanchion means. One such prop base part 30 may be fixedly bracketed to the outer face of an appropriate understructure and superimposed thereon is a mated relatively movable part 31. These bolted sections are preferably cushioned by an interposed buffer ring of rubber such as 32 which affords a restricted stanchion yield.

As a further structural refinement, we provide for an arched rear bridge piece 33 that fixedly spans the chassis beams. The installed bridge piece has a rear body cross sill 38 superimposed thereon and which sill may be housed by a flanged tail sheath 38A (see Figs. 10 and 11). The crown of the arched bridge piece may be cushioned by one or more closely spaced buffers such as 37 which when coacting with the triangularly disposed forward stanchions, serve as a resilient three-point mounting for yieldably upholding our cab whereby to ease the destructive effects of excessive chassis weave.

Disposed in spaced straddling relation to said bridge piece, are a pair of channeled strut members or slightly inclined floor supporting beams 35 of which their rear ends may each be riveted to the tail sheath 38A and the respective forward ends tied to a different upper prop section 31, as shown. The arrangement is such that the cab remains free to sway about its three point support. For additional rigidity, a transverse brace 36 may tie one of the struts 35 to the forward end of a longitudinal brace 34, which latter preferably aligns with a doorway sill.

Having fabricated the described all-metal cab understructure, it is now made ready to have wooden or the like body posts erected thereon. These may comprise a rear door jamb 40, a hinge jamb 41 and an angular riser 43, all of which may extend upwardly to the cab deck. The bottom of the hung door 18 may be shaped to clear the fender guard and have its hinge jamb erected above the front axle, as shown.

The split windshield 22 is preferably inclined rearwardly to substantially lie in a common projected plane with the front bumper 12. The sash mounting for the respective windshield side edges is detailed in Fig. 4 from which it will be seen that our sheathed demountable corner post 42 may be embracingly inset within a fixedly mounted angle iron riser 43 of which one leg forms a portion of the parting face 25 and the other leg is forwardly directed along the sheathed face of the post 42. A packed seal 44 serves to make such joint weatherproof. A suitable construction for the top edge of the frontal wall is disclosed in Fig. 6 in which the sealed wooden upper sash strip 45 is provided with metal tie clip means 46 that may be bolted at 47 to the transverse deck board 48. The upper angular portion of said part line designated 25', is intended to terminate between the sash strip 45 and the deck board 48 to allow the assembled windshield to be demounted bodily as a component of our composite frontal wall 20.

A side pane or window 49 may be located behind each vertical edge of the windshield. In order to secure a firm mounting for the hinged door jamb and to generally stiffen the cab region lying under said window, it is preferred to construct the erected body sides of Fig. 10 as double walls comprising a rear outside panel sheath 50 and a relatively heavy reenforcing lining plate 51 that fixedly bridge the hinged jamb 41 and the stiffening riser 43, as shown. This provision has in practice been found expedient to counteract body weave.

As will be seen from Fig. 5, each forwardly projecting skirt panel 21 may likewise be given a double wall formation to include a corresponding outside sheath 52 together with a mated lining plate 53. The upstanding rear edge of the last named plate may be permanently attached to the sheathed corner upright 42 and be provided with separable fastener brackets such as 54 that when severed, permit the embraced corner post 42 to be withdrawn along the part line 25 as an inbuilt component of the demountable frontal wall 20. The dash board 55 (see Fig. 5) may be subtended chordwise between the vertical rear edges of the respective skirts and be made removable with said frontal wall, in which event an independently supported carrier 55A serves as the instrument panel. The reenforced forward edges of each projecting skirt 21 may likewise be equipped with similar fastener brackets such as 57 in order to secure the lowered grille in place.

Referring now to the structural aspects of our dished radiator hood 23, these are revealed in Figs. 8 and 9. The transversely disposed cellular radiator core 58 is preferably located immediately behind the grille and provided with bolted feet or the like that may respectively rest upon the forward chassis cross beam 56 (see Fig. 7). After disconnection of its tank piping, said radiator is adapted to be unobstructedly lifted upwardly. Such radiator tank piping may be run through or beneath said dash board.

The hinge means by which said manipulative hood may be swung rearwardly to gain convenient access to the radiator, its normally concealed filler cap 59, the sump oil spout 60, its bayonet gauge, also other power accessories, may consist in a pair of complementary guide links 61 and 62 of which the respective lower ends may be pivoted to the skirt bracket 63 while the upper ends are pivotally attached to the hood bracket 64. When raised, said hood assumes its Fig. 9 position, the linkage being arranged to swing the rear hood edge clear of the drained drip trough 65, which latter may be supported by the dash board 55 and located immediately beneath the lower windshield edge, as shown. When the hood is latched in closed position, its rear transverse edge usually stands away somewhat from the windshield sash to leave a slight space therebetween. The drip trough serves as a trap during inclement weather that drains the rain endwise to the road bed. The lower edge of said dash board may be recessed into a ledge adapted to receive the upper edge of the inclined toe board 66. The lower edge of this toe board may be similarly cleated to the floor board 16 and made independently removable through a cab side door.

The engine unit 70 may be yieldably mounted between the chassis beams 10 and 11 in the conventional manner and provided with a belted fan 71 located closely contiguous to the rear of the radiator 58. Such fan and the like forward engine appurtenances can to a considerable extent be serviced through the opened hood 23. Should this restricted room prove inadequate, the liftable grille or the radiator core may be independently removed to augment access to such closely housed engine parts.

The rear end of the engine may be protectively encased within a demountable cover 72 adapted to be taken out through one of the cab side doors after the hood latches 73 are released. In the event it is required to dismantle the engine for major repairs, the frontal wall 20 may be taken off bodily along the part line 25 but leaving the remainder of our sectionalized cab intact on the chassis. It will be understood that such frontal wall when operatively installed, is tightly bolted in place to adjoining cab members by a plurality of clips such as 46 and 54.

As will appear from Fig. 3, said cab may also be equipped with a steering wheel 74, a driver's seat 75 and a spare passenger seat 76 or a single combined seat that may be upheld by an open tubular base. Because of the compactness of the disclosed engine installation and lack of room under its closely fitted rear cover 72, it is preferred to install an air cleaner 78 within a ventilated tubular seat base 77 as schematically indicated in Fig. 7 by dotted outline and to operatively connect the same to the engine manifold 80 through a lead pipe such as 79 or the like conduit means.

The function of the several body parts and the intended mode of operation thereof are thought to be obvious. The provision for a separately liftable hood 23 disposed in the medial region of our full height frontal wall 20, assumes significance in that it affords convenient access for serving the forward portion of our compactly installed power equipment, and which exposed hood when closed, provides for a weatherproof seal for such motorized truck accessories. Said stepped frontal wall may be given a stream-lined profile including a neatly rounded nose region that projects forwardly of the windshield to a limited extent and it is this particular region that may be equipped with said access hood.

When said frontal wall is bodily removed, the engine unit upon being lifted somewhat, may be unobstructedly skidded forwardly between the widely spaced side walls. The fact that the dash board 55 may constitute a part of the frontal wall, provides for adequate head room clearance for the skidded engine unit. Accordingly, all essential appurtenances including certain grease cups are made accessible, although compactly installed in the "cab over engine" fashion. If preferred, the lower end region of the part line 25 may be differently disposed so as to extend forwardly along the bottom face of the hood 23, in which case the respective skirt panels 21 would be fixedly attached and become permanent components of the cab side walls, the hood bracket 63 then being differently supported.

It will be obvious that the present sectionalized body refinements are likewise applicable to buses, vans or the like unitary vehicle bodies equipped with an integral rather than a separate cab compartment as shown. The term "compartment" as used in the claims is intended to cover either style of body, although the forward or driver's compartment may not be definitely partitioned and in which the engine may lie further forward of the windshield than commonly prevails in the so-called cab-over-engine type of installation.

The foregoing rather explicit disclosures should make apparent to those skilled in this art, the inherent advantages afforded by our improved body assembly, it being understood that various equivalent changes in the illustrative embodiment thereof may be resorted to, all without departing from the spirit and scope of our invention heretofore described and more particularly pointed out in the appended claims.

We claim:

1. A vehicle body including a sectionalized forward compartment of the cab-over-engine type of which one section is provided with complementary side wall components that are bridged by a deck component and of which walls the lower edge sections respectively lie adjacent to a different front wheel fender, the forward edge of each such side wall component being shaped to provide for a parting face that extends downwardly from said deck component to its adjacent fender, a demountable frontal closure section abuttingly fitted to match such parting faces and make a joint therealong, said frontal section being unitary in structure to comprise a framed windshield detachably mounted beneath the deck together with a pair of skirt panels respectively extending forwardly in substantial registry beyond a contiguous side wall to leave an upturned access opening between said panels and which opening is closable by a hood, and an engine unit including certain forwardly located accessories therefor that are housed between said skirt panels and beneath the closed hood, said hood when opened allowing said accessories to be serviced therethrough while said frontal section remains in place.

2. A vehicle body including a sectionalized forward compartment of the cab-over-engine type of which one section is provided with complementary side wall components that are bridged by a deck component and the respective forward edges of which walls are shaped to provide for mated parting faces extending downwardly and forwardly from the deck, a demountable frontal closure section abuttingly fitted to match such parting faces, said frontal section being unitary in structure to comprise a windshield frame having an upper sash detachably mounted beneath the deck and a horizontally seatable access hood disposed forwardly of the lower sash of said frame to tilt upwardly toward the windshield about linked pintle means located adjacent to the lower sash, and engine accessories including a forwardly located radiator housed beneath the hood seat and which hood when opened allows certain of said accessories to be serviced therethrough while said frontal section remains in place.

3. A vehicle body including a sectionalized forward compartment of the cab-over-engine type of which one section is provided with complementary side wall components that are bridged by a deck component and of which walls the lower edges respectively lie adjacent to a different front wheel fender, the forward edges of each such side wall component being shaped to provide for a parting face extending downwardly from the deck to its adjacent fender, a demountable frontal closure section abuttingly fitted to match such parting faces, said frontal section being unitary in structure to comprise a framed windshield having an upper sash detachably mounted beneath the deck together with a pair of arcuate skirt panels of which the respective rearward ends substantially align with a contiguous side wall and their upper skirt edges extend forwardly beyond the lower sash of said frame in spaced converging relation to constitute a stream-lined nose region having an upturned access opening therethrough, an upstanding grillework inserted between the converging forward ends of said panels, and plural fastener means for demountably securing such frontal wall in place whereby to make a closure joint along said mated parting faces.

4. A vehicle body including a sectionalized forward compartment of the cab-over-engine type of which one section is provided with complementary side walls that are bridged by a deck component and respectively lie adjacent to a different front wheel fender, said side walls being erected upon a skeletonized subframe assembled to include a pair of laterally warped wheel housing rails respectively shaped to conform with a portion of its adjacent fender, the forward rail ends being given reversed arcuate contours that converge to leave a space therebetween, an upright grillework mounted within such rail spacing, and a demountable unitary frontal closure section including complementary skirt panels whose respective lower edges are fitted to make a separable joint with a different adjacent rail porition.

5. In a motorized vehicle including laterally spaced frame beams, a sectionalized body compartment of the cab-over-engine type of which body one section is provided with inbuilt complementary side walls that are bridged by a deck and the lower edges of which walls respectively lie adjacent to a different front wheel fender, said side walls being erected upon a skeletonized subframe upheld by said beams and which assembled subframe includes a pair of laterally warped wheel housing rails respectively shaped to conform with a portion of its adjacent fender, the forward rail ends being given reversed arcuate contours that converge inwardly, separate jointed stanchion means serving to prop each such rail, said means comprising a fixed base part together with a superimposed relatively movable part that are yieldably interconnected by buffer means, and a demountable unitary frontal closure section including complementary skirt panels respectively disposed as a forward extension of a contiguous side wall, and whose respective lower skirt edges are fitted to make a separable joint with a different adjacent rail portion.

6. In a motorized vehicle including laterally spaced frame beams, a sectionalized body compartment of the cab-over-engine type of which body one section is provided with complementary side walls that are bridged by a deck and the lower edges of which walls respectively lie adjacent to a different front wheel fender, said side walls being erected upon a skeletonized metal subframe assembled to include a pair of warped wheel housing rails respectively shaped to conform with a portion of its adjacent fender, separate jointed stanchion means serving to prop each such rail with respect to the frame beams, said means comprising a fixed base part together with a superimposed part that are yieldably interconnected by buffer means, and a bridge piece including medially disposed buffer means upheld by said frame beams and which buffer means in conjunction with the aforesaid stanchion means constitute a cushioned three point support for said body compartment.

7. In a motorized vehicle including laterally spaced frame beams, a sectionalized body compartment of the cab-over-engine type of which body one section is provided with a floor and complementary side walls that are bridged by a deck and the lower edges of which walls respectively lie adjacent to a different front wheel fender, said side walls being erected upon a skeletonized metal subframe upheld by said beams and assembled to include a pair of laterally warped wheel housing rails respectively shaped to conform with a portion of its adjacent fender, separate jointed stanchion means serving to prop each such rail, said means comprising a base part together with a superimposed part that are yieldably interconnected by buffer means, a rearwardly disposed bridge piece upheld transversely by said frame beams, cushioned sill means superimposed upon the bridge piece and having buffer means interposed therebetween, a tail sheath cooperating with the sill means, and floor sustaining struts connected to said tail sheath in straddling relation to the bridge piece and respectively extending longitudinally forward for fixed attachment to the superimposed part of a corresponding jointed stanchion.

8. A vehice body including a sectionalized forward compartment of the cab-over-engine type of which one section is provided with complementary side walls that are permanently bridged by a deck and the lower edges of which walls respectively lie adjacent to a different front wheel fender, said side walls being fixedly erected upon a skeletonized subframe assembled to include a pair of warped wheel housing rails respectively shaped to conform with a portion of its adjacent fender, a cross-sectionally angular riser erected upon the curved portion of each such rail and extending upwardly for permanent attachment to the deck, one leg of said riser being directed forwardly and the other leg being directed outwardly therefrom to constitute a parting face for the body sections, a unitary frontal closure section including a pair of laterally spaced corner uprights defining opposed marginal regions of said closure section and arranged to be embracingly centered within the respective legs of corresponding risers, and fastener means demountably securing such closure section in place.

9. In a motorized vehicle including laterally spaced frame beams, a sectionalized body compartment of the cab-over-engine type of which body one section is provided with complementary side walls that are bridged by a deck and the lower edges of which walls respectively lie adjacent to a different front wheel fender, said side walls being erected upon a skeletonized subframe upheld by said beams and which assembled subframe includes a pair of warped wheel housing rails respectively shaped to conform with a portion of its adjacent fender, a door carrying jamb erected upon one such rail to provide for a side wall doorway, an angular riser erected upon each such rail forwardly of said doorway and extending upwardly to the deck, a window located between one such riser and said jamb, an outside sheath and a reenforcing lining plate disposed beneath said window to rigidly bridge said one riser and its adjacent jamb, and a bodily removable frontal section including laterally spaced corner uprights that are respectively attached to a different riser.

10. A vehicle body including a sectionalized forward compartment of the cab-over-engine type of which one section is provided with complementary side walls that are bridged by a deck and the lower edges of which walls respectively lie adjacent to a different front wheel fender, the forward edge of each such side wall being shaped to provide for a parting face that extends downwardly and forwardly from the deck, and a demountable frontal closure section abuttingly fitted to match such parting faces and which section is unitary in structure to comprise a windshield frame having an upper sash detachably mounted beneath the deck together with a section portion that projects forwardly beyond the lower sash of the windshield frame, said projecting section portion being provided with an upturned opening that is closable by a manipulative hood whose marginal rear edge is hinged alongside said lower sash and protectively sealed by a drip trough that cooperates with the lower sash edge to constitute a drained trap for the hood when closed.

11. A vehicle body including a sectionalized forward compartment of the cab-over-engine type of which one section is provided with complementary side walls that are bridged by a deck and the lower edges of which walls respectively lie adjacent to a different front wheel fender, the forward edge of each such side wall being shaped to provide for a parting face extending downwardly and forwardly from the deck, a demountable frontal closure section fitted to match such parting faces and which section is unitary in structure, a longitudinally disposed engine unit including an intake manifold mounted interiorly behind said frontal section, a seat mounted upon a hollow floor pedestal located toward the rear end of the engine unit, an air cleaner operatively installed within said pedestal, and conduit means connecting the air cleaner with said manifold.

12. A vehicle body including a sectionalized forward compartment of the cab-over-engine type of which one section is provided with a floor and complementary side walls that are bridged by a deck and the lower edges of which walls respectively lie adjacent to a different front wheel fender, each forward edge of such side walls being shaped to provide for a parting face that extends downwardly and forwardly from said deck, a demountable frontal wall section fitted to match such parting faces and make a closure joint therealong, said section being unitary in structure to comprise a windshield frame having a lower sash together with a nose portion including a closable access opening located forwardly of said sash and which nose is provided with an affixed dash board spanning the rear thereof, and a longitudinally disposed engine unit including accessories of which the end region lying forwardly of the dash board is housed interiorly of said nose portion and beneath said access opening to be serviced therethrough while the frontal section remains in place.

13. A vehicle body including a sectionalized forward compartment of the cab-over-engine type of which one section is provided with a floor and complementary side walls that are bridged by a deck and the lower edges of which walls respectively lie adjacent to a different front wheel fender, the forward edge of each such side wall being shaped to provide for a parting face extending downwardly and forwardly from said deck, a demountable frontal closure section abuttingly fitted to match such parting faces and comprising a windshield frame together with a nose portion having a closable access opening that extends horizontally forwardly from the lower edge of said frame, and a longitudinally disposed engine unit of which the forward end region is provided with accessories including oil filler means installed within said nose confines and concealed behind the closed opening thereof, said access opening allowing the oil filler means to be serviced while the frontal section remains in place.

14. A vehicle body including a sectionalized forward compartment of the cab-over-engine type of which one section is provided with a floor and complementary side walls that are bridged by a deck and the lower edges of which walls respectively lie adjacent to a different front wheel fender, the forward edge of each such side wall being shaped to provide for a parting face extending downwardly from said deck and forwardly thereof to spacedly conform with a portion of its adjacent fender, a demountable frontal wall section fitted to match such parting faces and make a separable joint therealong, said section being unitary in structure to comprise a windshield frame having a lower sash together with a nose portion including a closable access opening located forwardly of said sash, and stay means interposed between one such fender and its adjacent lower side wall edge serving to maintain the initial spaced conformation thereof.

GEORGE S. PIROUMOFF.
LESTER L. CROSS.